(Model.)
J. MILLS.
WAGON SCALE.
No. 245,201. Patented Aug. 2, 1881.
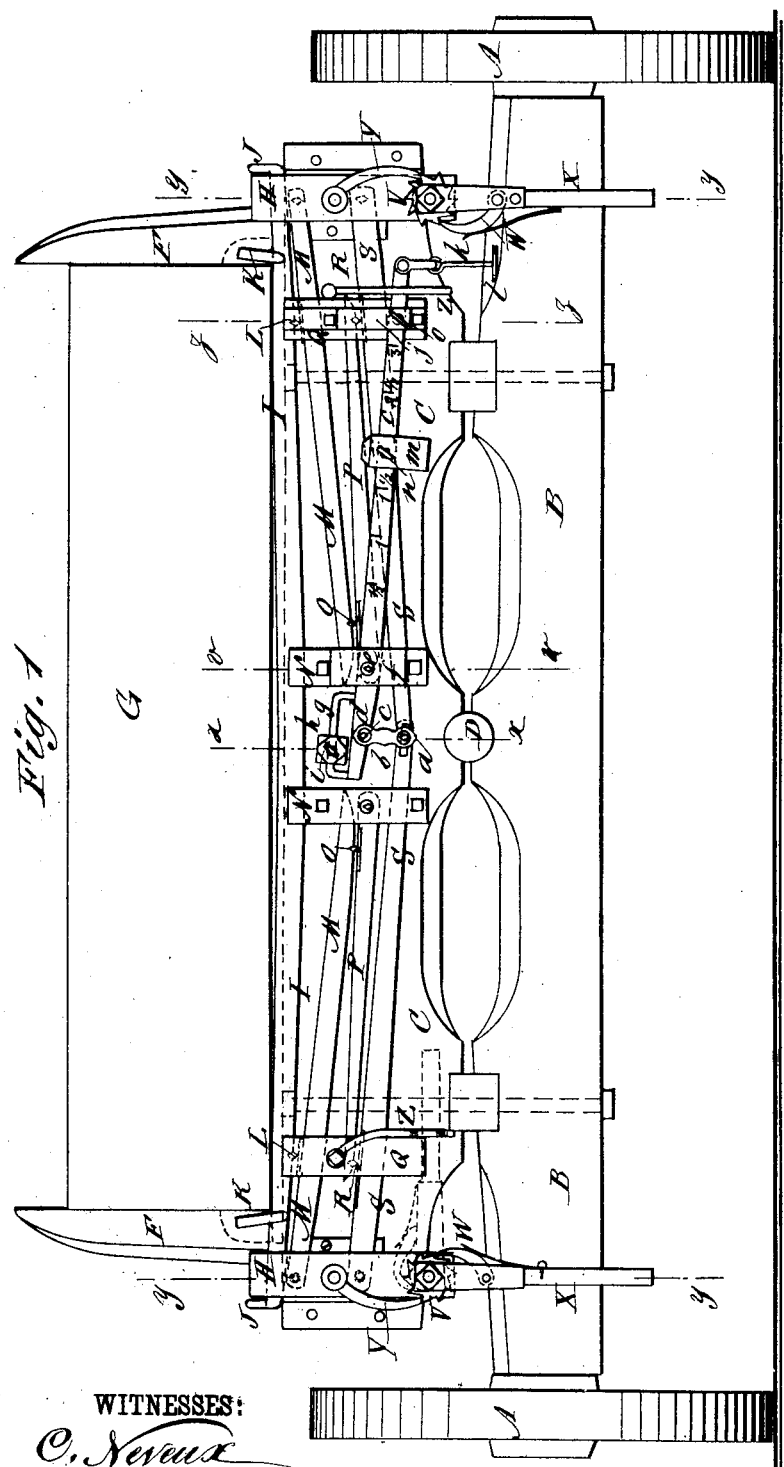
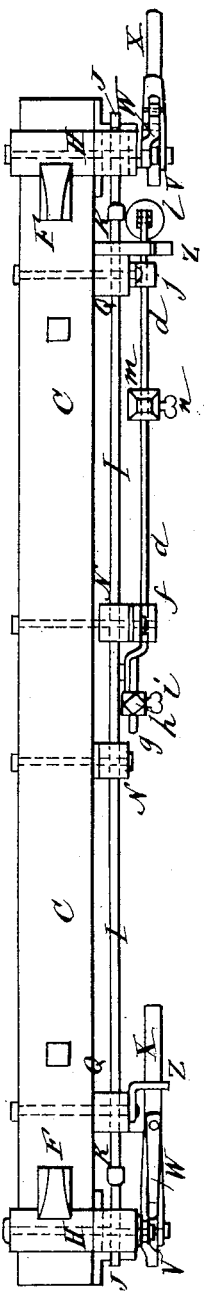
WITNESSES:
C. Neveux
C. Sedgwick
INVENTOR:
J. Mills
BY Munn & Co
ATTORNEYS.

(Model.)
2 Sheets—Sheet 2.
J. MILLS.
WAGON SCALE.
No. 245,201. Patented Aug. 2, 1881.
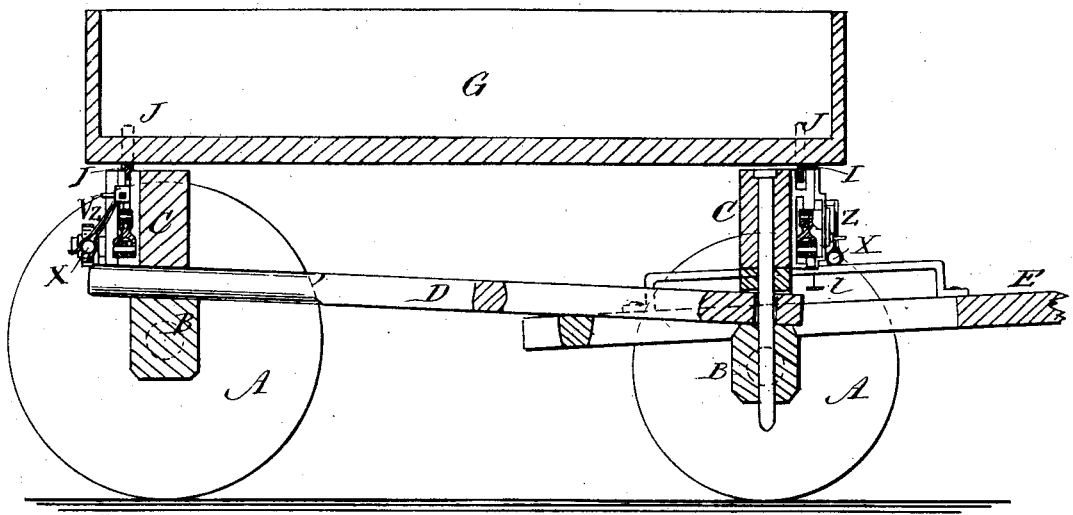
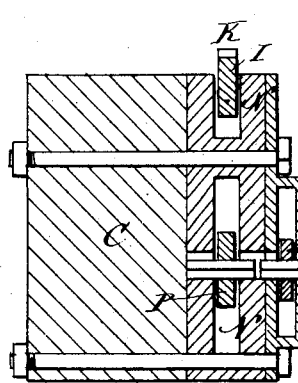
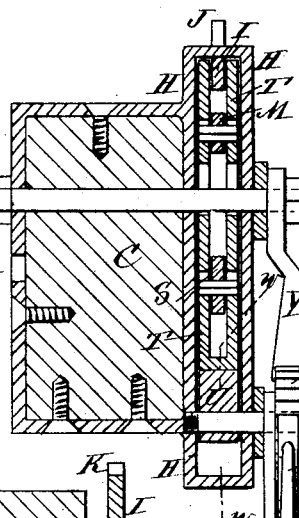
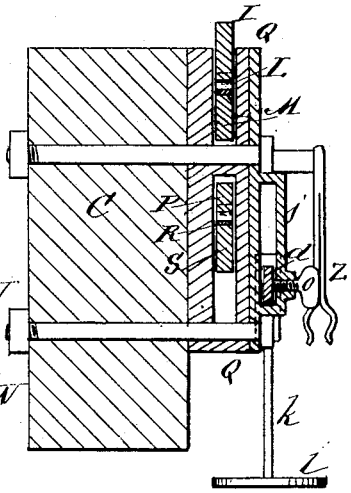
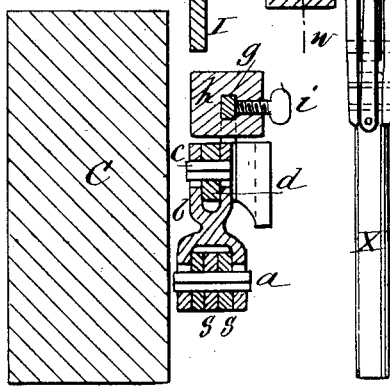
WITNESSES:
C. Neveux
C. Sedgwick
INVENTOR:
J. Mills
BY Munn & Co
ATTORNEYS.

UNITED STATES PATENT OFFICE.

JACOB MILLS, OF MARSHALL, COLORADO.

WAGON-SCALE.

SPECIFICATION forming part of Letters Patent No. 245,201, dated August 2, 1881.

Application filed February 4, 1881. (Model.)

*To all whom it may concern:*

Be it known that I, JACOB MILLS, of Marshall, in the county of Boulder and State of Colorado, have invented a new and useful Improvement in Wagon-Scales, of which the following is a specification.

Figure 1, Sheet 1, is a rear elevation of my improvement shown as applied to a wagon. Fig. 2, Sheet 1, is a plan view of the improvement shown as applied to the bolster of a wagon. Fig. 3, Sheet 2, is a vertical section taken through the line $x\ x$, Fig. 1. Fig. 4, Sheet 2, is a vertical section taken through the line $y\ y$, Fig. 1. Fig. 5, Sheet 2, is a vertical section taken through the line $z\ z$, Fig. 1. Fig. 6, Sheet 2, is a vertical section taken through the line $v\ v$, Fig. 1. Fig. 7, Sheet 2, is a vertical section taken through the line $x\ x$, Fig. 1, enlarged. Fig. 8, Sheet 2, is a vertical section taken through the line $u\ u$, Fig. 4, to show the eccentric.

Similar letters of reference indicate corresponding parts.

The object of this invention is to facilitate the weighing of loads while in the wagon-bodies.

The invention consists in constructing a wagon-scale of sets of compound levers connected with the bolsters of a wagon, having a cross-bar resting upon their short arms to support the wagon-body and its contents, and having a scale-beam connected with the long arms of the said compound levers, so that the wagon-body and its contents can be conveniently weighed.

The invention further consists in combining with the bolsters and the sets of compound levers, eccentrics, ratchet-wheels, and pawls, whereby the compound levers and the cross-bars can be forced upward to raise and support the wagon-body and its contents while being weighed, as will be hereinafter fully described.

A represents the wheels, B the axles, C the bolsters, D the reach, E the tongue, F the stakes, and G the body, of an ordinary wagon.

To the outer sides of the end parts of each bolster C are attached slotted bars or keepers H, through the upper ends of which pass the end parts of a cross-bar, I. Upon the ends of the bar I are formed upwardly-projecting guards J to keep the said bar I from slipping out of the keepers H; and upon the said bar I, at a little distance from its end, are formed upwardly-projecting guards K, to rest against the sides of the wagon-body G to center the said bar upon the said wagon-body.

To the lower edge of the bar I, at a little distance from the inner guards, K, are attached knife-edges L, which rest upon the upper edges of the levers M. The inner ends of the levers M enter and play in keepers N attached to the bolster C upon the opposite sides of and at a little distance from its center.

To the lower edges of the levers M, at a little distance from their inner ends, are attached knife-edges O, which rest upon the upper edges of the levers P. The inner ends of the levers P are pivoted in and to the keepers N. The outer ends of the levers P enter and play in keepers Q, attached to the bolster C, and which serve also as keepers to the levers M S and bar I.

To the lower edges of the levers P, at or near their outer ends, are attached knife-edges R, which rest upon the upper edges of the levers S. The outer ends of the levers M S, within the keepers H, are pivoted to and connected by links, straps, or bars T. The outer ends of the levers S rest upon eccentrics U, which are pivoted to and within the lower ends of the keepers H.

To the outer ends of the pivots of the eccentrics U are attached ratchet-wheels V, which are operated to turn the said eccentrics U by spring-pawls W, pivoted to and operated by the levers X. The upper ends of the levers X are slotted to receive the ratchet-wheels V and pawls W, and are perforated to receive the pivots of the eccentrics U, upon which the said levers X swing. The ratchet-wheels V are held by pawls Y from being turned back by friction when the spring-pawls W are drawn back for another stroke. The pawls Y are pivoted to the keepers H or other suitable support. The free ends of the levers X, when not in use, are swung up into the spring-jaws of the holders Z, the shanks of which are secured to the keepers Q, or to supports attached to the bolster C. The inner end of one of the levers S is inserted in the slotted end of the other lever S, and has a knife-edged pivot, $a$, attached to it, which passes through an elongated hole in the slotted end of the said other lever S, and through holes in the slotted lower end of the link or bar $b$. The upper end of the link $b$ is connected by a knife-edged pivot, $c$, with the short arm of the scale-beam $d$, which is pivoted by a knife-edged pivot, $e$, to a keeper, $f$, attached to the keeper N or to the bolster C.

To the end of the short arm of the scale-beam $d$, and to the long arm of the said scale-beam at a little distance from its pivot $c$, are attached the downwardly-bent ends of a rod, $g$, upon which is placed a weight, $h$, so that by adjusting the said weight $h$ the body G can be exactly balanced before loading the wagon. The weight $h$ is secured in place, when adjusted, by a set-screw, $i$, passing into it and resting against one side of the rod $g$. The end of the long arm of the scale-beam $d$ passes through and works in a keeper, $j$, attached to the keeper Q or the bolster C. From the free end of the scale-beam $d$ is suspended a rod, $k$, having a disk, $l$, attached to its lower end to receive weights for roughly weighing the load.

The load is balanced and its exact weight obtained by adjusting a weight, $m$, upon the scale-beam $d$. The scale-beam $d$ is provided with a scale of division-marks of pounds and fractions of a pound to give the weight balanced by the sliding weight $m$. The weight $m$ is secured in place upon the scale-beam $d$, when not in use, by a set-screw, $n$, passing into the said weight $m$ and resting against the side of the said scale-beam $d$.

The scale-beam $d$ is held in place, when the wagon is being drawn from place to place, by a set-screw, $o$, which passes through the keeper $j$ and rests against the side of the said scale-beam $d$, as shown in Figs. 1 and 5. A similar set of compound levers and scale-beam is connected with each bolster of the wagon, so that the entire load will be supported by the weighing-instruments, and the weight of the load will be found by adding the weights indicated by the separate instruments and deducting the weight of the wagon-body.

Having thus fully described my invention, I claim as new and desire to secure by Letters Patent—

1. A wagon-scale constructed substantially as herein shown and described, consisting of the cross-bar I, the sets of compound levers M P S, the scale-beam $d$, and the eccentrics U, ratchet-wheels V, and pawls W Y, as set forth.

2. In a wagon-scale, the combination, with the bolster C, of the cross-bar I, the sets of compound levers M P S, and the scale-beam $d$, substantially as herein shown and described, whereby the load can be weighed while in the wagon, as set forth.

3. In a wagon-scale, the combination, with the sets of compound levers M P S, of the eccentrics U, the ratchet-wheels V, and the pawls W Y, substantially as herein shown and described.

JACOB MILLS.

Witnesses:
 JAMES CAREY,
 E. N. MINER.